United States Patent
Mottaez et al.

(10) Patent No.: US 9,280,625 B2
(45) Date of Patent: Mar. 8, 2016

(54) INCREMENTAL SLACK MARGIN PROPAGATION

(71) Applicant: Synopsys, Inc., Mountain View, CA (US)

(72) Inventors: Amir H. Mottaez, Los Altos, CA (US); Mahesh A. Iyer, Fremont, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/860,450

(22) Filed: Sep. 21, 2015

(65) Prior Publication Data

US 2016/0012166 A1  Jan. 14, 2016

Related U.S. Application Data

(62) Division of application No. 13/691,480, filed on Nov. 30, 2012, now Pat. No. 9,171,122.

(60) Provisional application No. 61/566,464, filed on Dec. 2, 2011.

(51) Int. Cl.
*G06F 9/455* (2006.01)
*G06F 17/50* (2006.01)

(52) U.S. Cl.
CPC .................. *G06F 17/5031* (2013.01)

(58) Field of Classification Search
USPC ......................... 716/108, 113, 134
See application file for complete search history.

(56) References Cited

U.S. PATENT DOCUMENTS

| | | | |
|---|---|---|---|
| 6,526,543 B1 * | 2/2003 | Rosser | G06F 17/505 716/104 |
| 6,634,015 B2 | 10/2003 | Lee et al. | |
| 6,725,438 B2 | 4/2004 | van Ginneken | |
| 7,434,187 B2 | 10/2008 | Brahme et al. | |
| 7,844,931 B2 | 11/2010 | Hutzl et al. | |
| 8,060,844 B2 * | 11/2011 | Gidon | G06F 17/505 716/101 |
| 8,461,893 B2 | 6/2013 | Gasper et al. | |
| 8,539,413 B1 * | 9/2013 | Singla | G06F 17/5031 716/108 |
| 8,584,065 B2 | 11/2013 | Iyer et al. | |
| 8,762,915 B1 * | 6/2014 | Prabhakar | G06F 17/505 716/108 |
| 2001/0029600 A1 * | 10/2001 | Lee | G06F 1/505 716/108 |
| 2002/0116685 A1 * | 8/2002 | van Ginneken | G06F 17/505 716/113 |

(Continued)

*Primary Examiner* — Brian Ngo
(74) *Attorney, Agent, or Firm* — Park, Vaughan, Fleming & Dowler LLP; Laxman Sahasrabuddhe (57) ABSTRACT

Techniques and systems are described for improving the efficiency of timing calculations in numerical sequential cell sizing and for improving the efficiency of incremental slack margin propagation. Some embodiments cache timing-related information associated with a source driver that drives an input of a sequential cell that is being sized, and/or timing-related information for each output of the sequential cell that is being sized. The cached timing-related information for the source driver can be reused when sizing a different sequential cell. The cached timing-related information for the outputs of the sequential cell can be reused when evaluating alternatives for replacing the sequential cell. Some embodiments incrementally propagate slack margins in a lazy fashion (i.e., only when it is necessary to do so for correctness or accuracy reasons) while sizing gates in the circuit design in a reverse-levelized processing order.

9 Claims, 3 Drawing Sheets

(56) References Cited

U.S. PATENT DOCUMENTS

| | | | | |
|---|---|---|---|---|
| 2004/0255257 A1* | 12/2004 | Ratzlaff | ............. | G06F 17/5031 716/108 |
| 2006/0095879 A1* | 5/2006 | Brahme | ............... | G06F 17/505 716/113 |
| 2008/0216042 A1* | 9/2008 | Hutzl | ................. | G06F 17/5068 716/104 |
| 2009/0089721 A1* | 4/2009 | Alpert | ................. | G06F 17/5072 716/134 |
| 2012/0284680 A1* | 11/2012 | Iyer | .................... | G06F 17/5031 716/113 |
| 2013/0043923 A1* | 2/2013 | Gasper | .................. | H03K 5/133 327/281 |
| 2013/0145339 A1* | 6/2013 | Mottaez | ................. | G06F 17/505 716/134 |

\* cited by examiner

INCREMENTAL SLACK MARGIN PROPAGATION

RELATED APPLICATION

This application is a divisional of, and claims priority to, U.S. application Ser. No. 13/691,480, entitled "Efficient Timing Calculations in Numerical Sequential Cell Sizing and Incremental Slack Margin Propagation," by the same inventors, and filed on 30 Nov. 2012, the contents of which are herein incorporated by reference in their entirety for all purposes. U.S. application Ser. No. 13/691,480 claims benefit of U.S. Provisional Application Ser. No. 61/566,464, by the same inventors, filed on 2 Dec. 2011, the contents of which are herein incorporated by reference in their entirety for all purposes.

BACKGROUND

1. Technical Field

This disclosure relates to electronic design automation (EDA). More specifically, this disclosure relates to performing efficient timing calculations in numerical sequential cell sizing and performing efficient incremental slack margin propagation.

2. Related Art

The goal of circuit synthesis is to convert a high-level description of a circuit design into an implementation that meets a set of timing constraints, and at the same time optionally optimizes one or more metrics, such as area, leakage power, etc.

Some circuit synthesis approaches create an initial circuit design at a given abstraction level (e.g., a logical or physical design). Next, a cell is identified in the circuit design for optimization based on the metrics that are desired to be optimized. An optimal size for the identified cell is then determined by iteratively replacing the identified cell with functionally equivalent cells that have different sizes (this optimization process is also referred to as "sizing the cell," "sizing the gate," etc.). For each replacement cell size that is tried, the circuit synthesis approach updates timing information (often throughout the entire circuit design), and rejects cell sizes for which one or more timing constraints are violated. The iterative optimization process typically terminates after the optimization process has executed for a certain number of iterations or for a certain amount of time.

Iterative trial-and-error based circuit optimization processes often take too long to complete and/or produce poor quality results for large circuit designs in which timing constraints are checked across many process corners and modes. Therefore, there is a need to improve the efficiency of calculations that are performed during circuit optimization.

SUMMARY

Some embodiments described herein provide techniques and systems for improving the efficiency of timing calculations in numerical sequential cell sizing and for improving the efficiency of incremental slack margin propagation.

Some embodiments cache timing-related information associated with a source driver that drives an input of a sequential cell that is being sized. The cached timing-related information can then be reused for evaluating each alternative replacement sequential cell. The cached timing-related information can also be used to size a different sequential cell that is being driven by the source driver. Some embodiments cache timing-related information for each output of the sequential cell that is being sized. Then, the embodiments reuse the cached timing-related information while evaluating alternative sequential cells (i.e., as replacements for the sequential cell).

Some embodiments incrementally propagate slack margins while sizing gates in the circuit design. Specifically, a system can process gates in the circuit design in a reverse-levelized processing order. If a gate at level i is replaced with an alternative gate during optimization, then the system can mark the alternative gate as changed, and mark outputs of source drivers at level i+1 that drive inputs of the alternative gate as out-of-date. After all cells in the current level are sized, if an output of a source driver at level i+1 is marked out-of-date, then the system can compute a new arrival time at the output of the source driver, propagate the new arrival time to inputs of gates that are driven by the output of the source driver, and remove the out-of-date mark on the source driver. Next, the input of gates at the level being optimized are processed. If an input of a gate at level i is marked out-of-date (either because the cell's size was changed when processing level i, or another load of the cell's driver at level j, j<i, was sized) or if a slack margin was not computed (e.g., because the cell's size did not change when sizing level i) for an output of the gate, then the system can propagate arrival times from the input to the output of the second gate, and mark the output of the gate as having an out-of-date slack margin. Finally, the outputs of the gates at the level being optimized are processed. If an output of a gate is marked as having an out-of-date slack margin, the system can compute new slack margins for the gate output using the original slack margin at the output and the new and original arrival at the output. The system can also compute slack margins for all the inputs that reach the output of the gate (i.e. all inputs that have a timing arc to the output) based newly computed output slack margin, the new output arrival, and the arrival to the output from each of the inputs. In the beginning of the sizing step for level i+1, slack margins at the inputs of gates at level i (which have been updated by the method in the preceding description) can be propagated backward to the outputs of gates at level i+1.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality of the circuit design. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Efficient Timing Calculations in Numerical Sequential Cell Sizing

Numerical sequential cell sizing evaluates the launch and capture costs of the different library sequential cell alternatives for an instance. The alternative with the best overall cost is selected. Evaluation of each alternative's capture cost involves calculations related to the source driver such as source driver delay and output slew. Similarly, evaluation of each alternative's launch cost involves calculations related to the total load seen by the sequential cell instance as well as the available slack margin seen by the sequential cell. Techniques and systems for sizing a sequential cell are described in U.S. patent application Ser. No. 13/665,833, entitled "Sequential Sizing in Physical Synthesis," by inventors Mahesh A. Iyer and Amir H. Mottaez, filed on 31 Oct. 2012, the contents of which are herein incorporated by reference in their entirety.

A brute-force, but relatively inefficient, approach would calculate all relevant information for each alternative of the sequential cell. Embodiments described herein avoid redundant and repeated calculations by lazy evaluation and local caching of data which is used for the evaluation of all alternatives.

Figure 1:
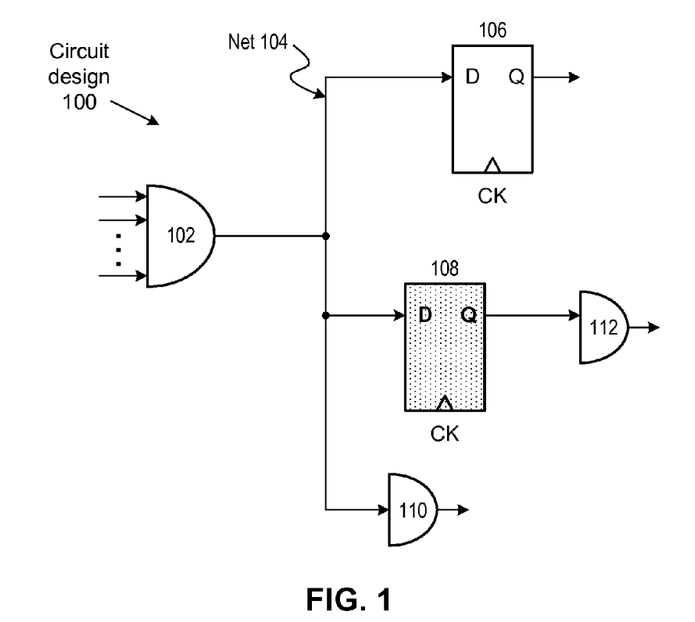
FIG. 1 illustrates a portion of a circuit design that includes a sequential cell in accordance with some embodiments described herein.

FIG. 1 illustrates a portion of a circuit design that includes a sequential cell in accordance with some embodiments described herein.

Circuit design 100 includes source gate 102. The output of source gate 102 is coupled using net 104 to the D input of sequential cell 106, the D input of sequential cell 108, and an input of gate 110. The Q output of sequential cell 108 is coupled to an input of gate 112. Sequential cells 106 and 108 receive a clock input which is labeled "CK" in FIG. 1.

In the following description, sequential cell 108 is assumed to be the sequential cell that is currently being optimized. Various performance improvement techniques and systems for avoiding redundant and repeated calculations and for caching local data are described below. These performance improvement techniques and systems can be used either separately or in combination with one another.

Caching the Slack Margin and Transition-Effect Coefficient

One performance improvement technique computes certain timing-related information associated with the source driver when evaluating the first sequential library cell alternative of the first visited sequential load of a source driver. The computed information is kept up-to-date (by performing incremental updates whenever necessary) and is reused for all subsequent alternatives of all sequential loads of the driver. For example, the information associated with source driver 102 can be computed when evaluating the first alternative of sequential cell 108 (which is assumed to be the first sequential cell to be optimized) is optimized. The information is then reused (after being incrementally updated if necessary) when evaluating all other alternative of sequential cell 108 as well as when sequential cell 106 is optimized.

The information that is computed at the output of the source driver (e.g., source driver 102) includes (1) the minimum slack margin and the identity of the load that propagated the minimum slack margin to the source driver, and/or (2) the worst transition induced delay slope and the identity of the load that propagated the worst transition induced delay slope to the source driver.

The slack margin (or "margin" for short) at an output pin of a gate can be determined by computing a difference between the slack value at the output pin of the gate and a corresponding slack value at a timing end-point whose required time was propagated back to the output of the gate for computing the slack value of the output of the gate. The slack margin at an output pin represents the extent to which a local change on the output pin affects the global timing of the corresponding timing end-points of the design. Examples of systems and techniques for computing and using slack margins are described in U.S. patent application Ser. No. 12/783,915, entitled "Global timing modeling within a local context," filed on 20 May 2010, the contents of which are herein incorporated by reference.

The minimum slack margin at the output of the driver is given by $$M_{min} = \min_{i \in driver's\ load} M_i,$$

where $M_i$ is the slack margin that is propagated by the $i^{th}$ load that is electrically coupled to the output of the driver. The identity (k) of the load that propagated the minimum slack margin is given by $$k = \underset{i \in driver's\,loads}{\arg\min}\; M_i.$$

If the source driver minimum slack margin was propagated from the sequential cell being sized (i.e., sequential cell 108 in the example shown in FIG. 1), and the size of the sequential cell is changed by sequential sizing, then a new minimum slack margin is computed (based on the new size of the sequential cell and its new required arrival time) and the new minimum slack margin is cached (i.e., stored for reuse). In some embodiments (for example when the new margin at the sequential cell input is larger than the original margin), the driver is simply marked as out-of-date, and its margin information is updated (and cached) when the next sequential cell load of the driver is sized.

A transition-induced penalty is a delay penalty that estimates the impact that a change in a transition has on the delays of downstream gates. A transition-effect coefficient (e.g., $t_{slope}$) represents a linear relationship between a change in the input transition and a change in the output delay. The $t_{slope}$ values for a gate can be computed from a non-linear delay model (NLDM) for the gate. Examples of systems and techniques for computing and using transition-effect coefficients are described in U.S. patent application Ser. No. 13/629,400, entitled "Modeling transition effects for circuit optimization," filed on 27 Sep. 2012, the contents of which are herein incorporated by reference.

The $t_{slope}$ values can be propagated using a number of techniques. In general, the intent is to propagate the $t_{slope}$ value in a way that ensures that sizing the driver gate by taking the propagated $t_{slope}$ value into consideration will result in a driver gate size that is unlikely to cause timing violations in downstream gates in the fan-out cone of the driver gate. In other words, the intent is to propagate back the "worst-case" transition-effect coefficient. One equation for propagating the $t_{slope}$ value is shown below:

$$t_{slope}^{driver} = \underset{i \in driver's\,loads}{\max}\; \{t_{slope}^i\}, \qquad (1)$$

where, $t_{slope}^{driver}$ is the propagated $t_{slope}$ value, and $t_{slope}^i$ is the $t_{slope}$ value for the $i^{th}$ load that is being driven by the driver gate. Equation (1) was presented for illustration purposes only. Many variations and modifications will be apparent to those of ordinary skill in the art.

In some embodiments, the $t_{slope}$ value that corresponds to the load with the minimum slack margin or the worst slack can be propagated to the source driver. The following equation propagates the $t_{slope}$ value that corresponds to the load with the minimum slack margin:

$$t_{slope}^{driver} = t_{slope}^k, \text{ where } k = \underset{i \in driver's\,loads}{\arg\min}\; M_i. \qquad (2)$$

In the above equation, $t_{slope}^k$ is the $t_{slope}$ value for the $k^{th}$ load, $M_i$ is the slack margin of the $i^{th}$ load, and the function argmin returns the value of argument i that corresponds to the minimum slack margin $M_i$.

If the source driver $t_{slope}$ was propagated from the sequential cell being sized (i.e., sequential cell 108 in the example shown in FIG. 1), and the size of the sequential cell is changed by sequential sizing, then a new $t_{slope}$ is computed (based on the new size of the sequential cell and its new required arrival time sensitivity to changes in slew) and the new $t_{slope}$ is cached (i.e., stored for reuse). In some embodiments (for example when the $t_{slope}$ at the sequential cell input is larger than the original $t_{slope}$), the driver is simply marked as out-of-date, and its $t_{slope}$ is updated (and cached) when the next sequential cell load of the driver is sized.

Information Cached at the Output of the Source Driver

The following source driver information can be computed once when processing/evaluating the first library cell alternative of a sequential cell and then be reused for evaluating all other library cell alternatives of that cell: (1) source driver input and its arrival, transition, and arc, (2) original transition ($s_{orig}$) at the output of the source driver (this is used in computing the transition-induced delay penalty ($d_{tp}$) when evaluating each sequential library cell alternative), and (3) partial load seen by the source driver (the partial load includes all of the loads that remain constant while the sequential cell is being optimized).

Source driver 102 may include multiple inputs and multiple outputs. The arrival time and input transitions at each of the inputs can be different, and the arc delay for each input-output arc can be different. When sequential cell 108 is optimized, the optimization process needs to select the arrival and input transition at one of the inputs of source driver 102, and also select an input-output arc of source driver 102 for computing the arc delay. Some embodiments described herein perform this selection process once, store the selection, and then reuse the selection while optimizing other loads of source driver 102. Some embodiments select the source driver input with the worst arrival time. Other embodiments select the source driver input with the worst slack margin.

The original transition ($s_{orig}$) at the output of the source driver is also selected and stored so that it can be used for determining the delay penalty for each alternative sequential cell that is considered as a replacement for sequential cell 108. The transition-induced penalty ($d_{tp}$) can be computed as follows:

$$d_{tp} = (s_{new} - s_{orig}) \cdot t_{slope}, \qquad (3)$$

where, $s_{new}$ and $s_{orig}$ are the new and original output transitions, respectively, at the output of the source driver gate. The $t_{slope}$ value in Equation (3) is the value that is cached at the driver from Equations (1) or (2). The original output transition corresponds to the transition at the output of source driver 102 for sequential cell 108 and other fixed "partial" loads (such as 106 and 110), and the new output transition corresponds to the transition at the output of source driver 102 for the alternative sequential cell that is being considered as a replacement for sequential cell 108 and the other fixed "partial" loads. Examples of systems and techniques for computing transition-induced delay are described in U.S. patent application Ser. No. 13/629,400, entitled "Modeling transition effects for circuit optimization," filed on 27 Sep. 2012, the contents of which are herein incorporated by reference.

When sequential cell 108 is replaced by an alternative sequential cell, it changes the load at the output of source driver 102. However, note that the total load at the output of the source driver 102 is made up of multiple components, and only one of those components changes when sequential cell 108 is replaced by the alternative sequential cell. Therefore, the part of the load that remains constant can be cached and reused as different alternative sequential cells are evaluated. Specifically, the partial load is given by:

$$\text{Partial load} = \sum_{s \in \text{wire segments}} C_{w_s} + \sum_{\substack{i \in \text{load pins} \\ i \neq \text{optimized load}}} C_{p_i},$$

and the total load at the output of source driver 102 can be calculated by adding the pin capacitance of the sequential cell that is currently being evaluated plus the partial load. In some embodiments, the source driver load is cached and reused for all alternatives of all sequential cell loads of the source driver (not just for the alternatives of one of the sequential loads of the source driver). In these embodiments, (a) we compute a total load of the source driver the first time that any of the sequential loads of the driver is sized, (b) when sizing one of the sequential loads of the source driver, we compute a partial load by subtracting the current pin cap of the sequential cell input being driven by the source driver, (c) update the total load if sequential sizing changes the sequential cell being sized.

Information Cached at the Output of the Sequential Cell

The following sequential cell output information is computed once when evaluating the first library cell alternative of a sequential cell being sized and reused for evaluating all other library cell alternatives of that cell: (1) original transition at each output of the sequential cell, (2) total load on each output of the sequential cell, and (3) minimum slack margin at each output of the sequential cell.

The original transition is computed for the original sequential cell (i.e., sequential cell 108), and is reused for computing the transition-induced delay (as explained above) at each output of an alternative sequential cell that is evaluated as a replacement for sequential cell 108. Note that the transition induced delay penalty is a function of the original slew and the new slew at the output of the sequential cell. The caching of the original slew at the output(s) of the sequential cell avoids repeated backward slew propagation from the loads driven by the sequential cell to its outputs.

When sequential cell 108 is being optimized, the output load on its outputs (e.g., the output load on the Q pin of sequential cell 108) does not change. Therefore, the total output load can be computed once for each output pin of the sequential cell, and then be reused for each alternative sequential cell that is considered as a replacement. The total output load at a given output pin of the sequential cell is given by:

$$\text{Sequential Cell output load} = \sum_{s \in \text{wire segments}} C_{w_s} + \sum_{i \in \text{Seq cell load pins}} C_{p_i}.$$

The minimum slack margin at each output pin of the sequential cell can be computed and stored. Specifically, the minimum slack margin at each output pin of the sequential cell can be computed once and then be reused for each alternative cell that is considered as a replacement during optimization. The minimum slack margin is given by:

$$\text{Sequential Cell output Margin} = \min_{i \in \text{Seq cell Loads}} \{\text{Margin}_i\}.$$

Processes for Efficient Timing Calculations

Figure 2A:
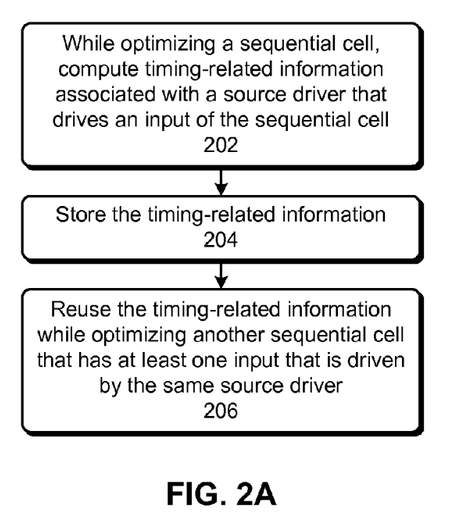
FIG. 2A presents a flowchart that illustrates a process for caching timing-related information associated with a source driver in accordance with some embodiments described herein.

FIG. 2A presents a flowchart that illustrates a process for caching timing-related information associated with a source driver in accordance with some embodiments described herein.

The process illustrated in FIG. 2A improves the efficiency of a system that performs sequential cell sizing. Specifically, while optimizing a sequential cell, the system can compute timing-related information associated with a source driver that drives an input of the sequential cell (operation 202). Next, the system can store the timing-related information (operation 204). The system can then reuse the timing-related information while evaluating all alternatives of the sequential cell or while optimizing another sequential cell that has at least one input that is driven by the same source driver (operation 206).

As explained above, the timing related information associated with a source driver can include one or more of: (1) a minimum slack margin at an output of the source driver that drives the input of the first sequential cell, (2) a worst case transition-effect coefficient at the output of the source driver that drives the input of the first sequential cell, (3) an input of the source driver whose arrival time and transition time is propagated to the output of the source driver that drives the input of the first sequential cell, (4) an arc from the input to the output of the source driver whose delay is used for computing an arrival time at the output of the source driver, (5) an arrival time and a transition value at the input of the source driver that is propagated to the output of the source driver, (6) an original transition value at the output of the source driver that corresponds to the first sequential cell, and (7) a partial load that represents a sum of all loads on the output of the source driver except for the load of the input of the first sequential cell.

Further, as explained above, if (1) a sequential cell is replaced by an alternative sequential cell during optimization and (2) the timing-related information was propagated to the output of the source driver from the sequential cell, then the system can incrementally update the timing-related information based on the old sequential cell and the alternative sequential cell.

Figure 2B:
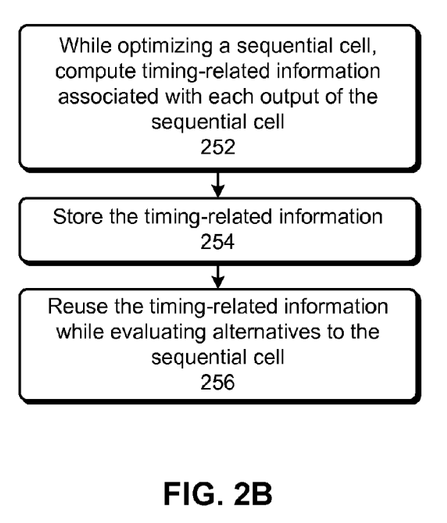
FIG. 2B presents a flowchart that illustrates a process for caching timing-related information associated with the outputs of a sequential cell in accordance with some embodiments described herein.

FIG. 2B presents a flowchart that illustrates a process for caching timing-related information associated with the outputs of a sequential cell in accordance with some embodiments described herein.

The process illustrated in FIG. 2B improves the efficiency of a system that performs sequential cell sizing. Specifically, while optimizing a sequential cell, the system can compute timing-related information associated with each output of the sequential cell (operation 252). Next, the system can store the timing-related information (operation 254). The system can then reuse the timing-related information while evaluating alternatives to the sequential cell (operation 256).

As explained above, the timing-related information associated with the outputs of the sequential cell can include one or more of: (1) a minimum slack margin at each output of the sequential cell, (2) a total load at each output of the sequential cell, and (3) an original transition value at each output of the sequential cell.

Efficient Incremental Slack Margin Propagation

Some embodiments optimize gates in the circuit design in a reverse-levelized order. In a reverse-levelized order, each logic gate is associated with a level so that each logic gate's level is greater than the highest level associated with logic gates that are electrically coupled to the logic gate's output. In a reverse-levelized ordering, the gates that are "near" the outputs of the circuit design have a lower level than the gates that are "near" the primary inputs of the circuit design. Optimizing gates in reverse-levelized order means that the gates are optimized in increasing order of their levels, i.e., a gate at level n will only be optimized after all gates at level n−1 have been optimized.

Figure 3:
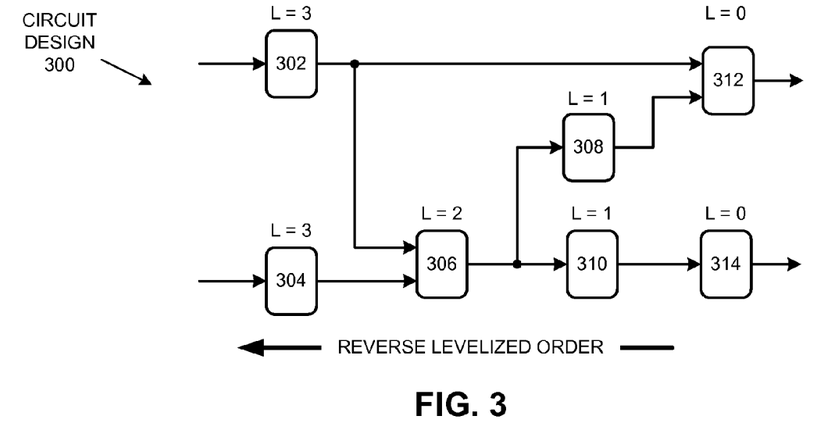
FIG. 3 illustrates a reverse-levelized processing order in accordance with some embodiments described herein.

FIG. 3 illustrates a reverse-levelized processing order in accordance with some embodiments described herein. In the figure, the notation "L=n," where n is a number denotes the level associated with the logic gate. Circuit design 300 includes logic gates 302-314 that have been assigned levels 0 through 3. As shown in the figure, logic gates are assigned a level that is greater than the highest level associated with the logic gates that are electrically coupled to the logic gate's outputs. For example, logic gate 302 is assigned level 3 because logic gate 306, which is electrically coupled to the output of logic gate 302, is assigned level 2. In a reverse-levelized optimization order, the optimization process optimizes logic gates in increasing order of their levels. For example, some embodiments described herein would optimize logic gates 312 and 314 before optimizing logic gates 308 and 310, and so forth.

Assuming that the slack margins at level n+1 are up-to-date when optimizing level n, the system begins by establishing the pre-optimization slack margin at the outputs of the gates to be optimized at level n (these are referred to as optimizable gates). The pre-optimization (original) slack margin at the output of each optimizable gate is computed by taking the minimum slack margin at the input of all gates that are electrically connected to that output, After a level of gates is optimized, new arrivals and slack margins need to be computed. New arrivals are computed for the output of all start-points of the optimizable gates (i.e., the gates that drive the inputs of the optimizable gates and are at level >n) as well as the inputs and outputs of the optimizable gates. Using the list of new arrivals from each of the inputs to the output of an optimizable gate, the old and new arrival at that output, and the old (original) slack margin at that output, we can compute the new slack margins for each of the inputs. For example, if gate 308 is replaced with an alternative gate during optimization, then the arrival times and slack margins will change at the following pins: (1) the output of gate 306, (2) the input of gate 308, (3) the input of gate 310, (4) the output of gate 308, and (5) the output of gate 310.

When the loads of a start-point are at different levels (for example the loads at the output of gate 302 are at different levels—gate 306 is at level L=2, and gate 312 is at level L=0), and the load gates are not changed by optimization, the embodiments described herein make the arrival and slack margin propagation efficient by avoiding unnecessary timing evaluations. Without this, the timing at the pins of the start-point cells as well as the input and output pins of the optimizable gates is evaluated unnecessarily leading to a worst-case quadratic run-time complexity for arrival and slack margin propagation. Incremental arrival and slack margin propagation utilizes the current list of start-point and optimizable gates (for the level being optimized) to incrementally propagate arrivals and slack margins.

Specifically, the incremental slack margin propagation process proceeds as follows. If the new discretized library cell of an optimized cell is different than its previously assigned library cell, then the system flags the start-points (pin) of that cell as out-of-date, and marks the optimized cell as being changed. For example, if gate 308 was replaced with an alternative gate, then the output of gate 306 is marked as being out-of-date and also the gate 308 is marked as being out-of-date.

The mark on the optimized cell achieves the following. When the gate has multiple inputs, and the other inputs are not used for optimizing the cell, we can mark their driver start-points as out-of-date. For example, suppose gate 312 is replaced with an alternative gate during optimization based on the input that is electrically coupled to gate 308. Then gate 312 is marked changed which causes the output of gate 302 to be marked out-of-date in addition to gate 308. Depending on the desired level of accuracy, this mark can either be ignored (i.e. only gate 308 is marked out of date), used only for start-points of input pins that are processed after the input pin that caused the change in the optimized gate's library cell, or used to flag all start-points of all inputs of the optimized gate.

Next, the system propagates changed start-points arrivals by going through the list of start-points and update arrivals on start-point outputs that are marked as out-of-date. New arrivals are propagated from the out-of-date start-point outputs to the loads that are driven by those pins (net evaluation). The loads are marked as out-of-date, and the out-of-date mark on the start-point pin is cleared. For example, if the output of start-point gate 302 is marked out-of-date, then a new arrival is computed at the output of gate 302, the new arrival is propagated to the inputs of gates 306 and 312, and the out-of-date mark on the output of gate 302 is cleared.

The system then propagates changed optimizable gate arrivals. Specifically, the system goes through the list of optimizable gates. If the gate has any out-of-date input pins or its slack margin has never been computed, then the arrivals from inputs of the gate are propagated to its outputs and the relevant outputs are marked as having out-of-date slack margin. For example, if gate 312 is replaced with an alternative gate, and its input was marked as out-f-date when computing new arrivals at the output of gate 302, then new arrivals are propagated from its inputs to its outputs. Note that the arrival propagation that is performed for computing slack margins is different from the usual arrival propagation that is performed in static timing analysis. Specifically, for computing slack margins, we temporarily store with each output of a gate the inputs that affect the arrival time at the output and the arrival associated with each input. For example, consider the case when arrival times are propagated from the inputs of gate 312 to the output of gate 312. In this case, we propagate two arrival times—one from each input to the output of gate 312. Examples of systems and techniques that propagate arrival times for slack margin computation are described in U.S. patent application Ser. No. 12/783,915, entitled "Global timing modeling within a local context," filed on 20 May 2010, the contents of which are herein incorporated by reference.

Finally, the system updates slack margins for changed optimizable gate inputs. Specifically, the system goes through the list of optimizable gate outputs. If the output is marked as having out-of-date slack margin, then the new and old arrivals at the output, the original slack margin at the output, and the list of input arrivals are used to compute (new) slack margins for each of the inputs.

Figure 4:
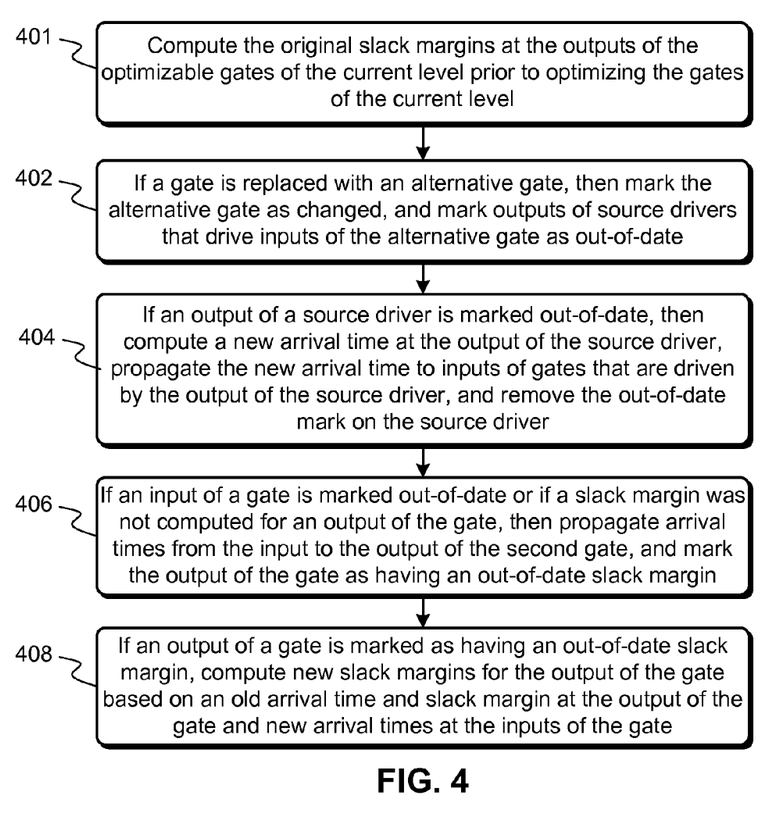
FIG. 4 presents a flowchart that illustrates a process for efficient incremental slack margin propagation in accordance with some embodiments described herein.

FIG. 4 presents a flowchart that illustrates a process for efficient incremental slack margin propagation in accordance with some embodiments described herein.

During circuit optimization, a system can propagate slack margins in an efficient manner by using the process illustrated in FIG. 4. The process can begin with computing the original slack margins at the outputs of the optimizable gates of the current level prior to optimizing the gates of the current level (operation 401). Next, the system can perform the conditional operations 402-408 described below while optimizing gates in the circuit design in a reverse-levelized processing order.

If a gate is replaced with an alternative gate during optimization, then the system can mark the alternative gate as changed, and mark outputs of source drivers that drive inputs of the alternative gate as out-of-date (operation 402).

If an output of a source driver is marked out-of-date, then the system can compute a new arrival time at the output of the source driver, propagate the new arrival time to inputs of gates that are driven by the output of the source driver, and remove the out-of-date mark on the source driver (operation 404). Note that operation 404 is performed after all optimizable gates in the current level are optimized.

Go through the optimizable gates of the current level and if an input of a gate is marked out-of-date or if a slack margin was not computed for an output of the gate, then the system can propagate arrival times from the input to the output of the second gate, and mark the output of the gate as having an out-of-date slack margin (operation 406).

Finally, go through the outputs of all optimizable gates of the current level and if an output of a gate is marked as having an out-of-date slack margin, the system can compute new slack margins for the output of the gate based on the new and old arrival time and the original slack margin at the output of the gate. Using the new slack margin at the output and the list of new arrival times for each of the inputs of the gate to that output, the system computes new slack margins for each of the inputs (operation 408).

Figure 5:
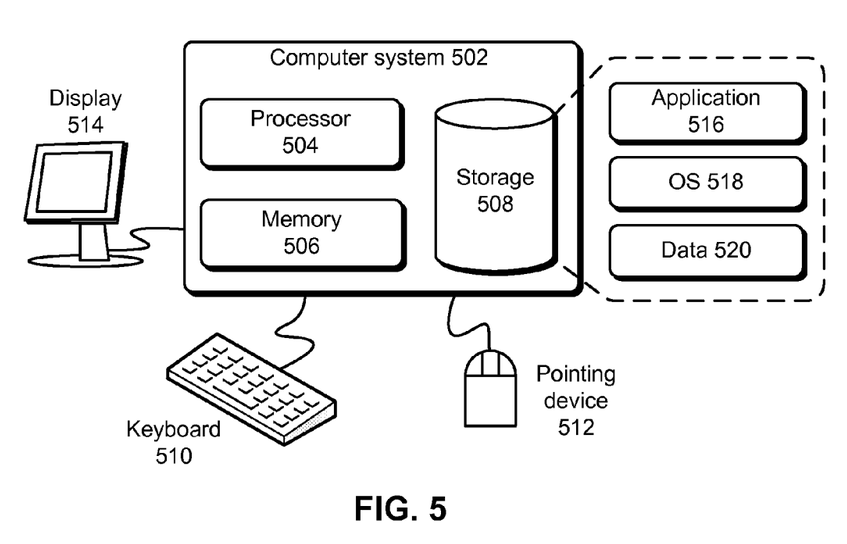
FIG. 5 illustrates a computer system in accordance with an embodiment of the present invention.

FIG. 5 illustrates a computer system in accordance with an embodiment of the present invention.

A computer system can generally be any system that can perform computations. Specifically, a computer system can be a microprocessor, an application specific integrated circuit, a distributed computing system, a cloud computing system, or any other computing system now known or later developed. Computer system 502 comprises processor 504, memory 506, and storage 508. Computer system 502 can be coupled with display 514, keyboard 510, and pointing device 512. Storage 508 can generally be any device that can store data. Specifically, a storage device can be a magnetic, an optical, or a magneto-optical storage device, or it can be based on flash memory and/or battery-backed up memory. Storage 508 can store application 516, operating system 518, and data 520.

Application 516 can include instructions that when executed by computer 502 cause computer 502 to perform one or more processes that are implicitly or explicitly described in this disclosure. Data 520 can include any data that is inputted into or outputted by application 516.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) tool in a computer, a method for incrementally propagating slack margins in a circuit design while optimizing the circuit design by processing gates in the circuit design in a reverse-levelized order, the method comprising:
   after the EDA tool in the computer replaces a first gate with an alternative gate, the EDA tool in the computer marking outputs of source drivers that drive inputs of the alternative gate as out-of-date;
   in response to the EDA tool in the computer determining that an output of a source driver is marked out-of-date, the EDA tool in the computer performing at least the following operations: (1) computing a new arrival time at the output of the source driver, (2) propagating the new arrival time to inputs of gates that are driven by the output of the source driver, and (3) removing an out-of-date mark from the output of the source driver;
   in response to the EDA tool in the computer determining that an input of a second gate is marked out-of-date or that a slack margin was not computed for an output of the second gate, the EDA tool in the computer performing at least the following operations: (1) propagating arrival times from the input to the output of the second gate, and (2) marking the output of the second gate as having an out-of-date slack margin; and
   in response to the EDA tool in the computer determining that an output of a third gate is marked as having an out-of-date slack margin, the EDA tool in the computer performing at least the following operations: (1) computing new slack margins for the output of the third gate based on the old arrival time, new arrival time, and old slack margin at the output of the third gate, and (2) computing new slack margins for each input of the third gate based on a new margin at the output of the third gate and an arrival time from each input of the third gate to the output of the third gate.

2. The method of claim 1, wherein processing gates in the circuit design in a reverse-levelized order comprises:
   assigning a level to each gate in the circuit design, wherein the assigned level is greater than the levels assigned to gates in the fan-out cone of the gate; and
   processing gates in increasing order of their assigned levels.

3. The method of claim 1, wherein a slack margin at a pin in the circuit design represents an extent to which a change in a slack value at the pin affects a slack value at a timing end-point.

4. A non-transitory computer-readable storage medium storing instructions of an electronic design automation (EDA) tool that, when executed by a computer, cause the computer to perform a method for incrementally propagating slack margins in a circuit design while optimizing the circuit design by processing gates in the circuit design in a reverse-levelized order, the method comprising:
 after replacing a first gate with an alternative gate, marking outputs of source drivers that drive inputs of the alternative gate as out-of-date;
 in response to determining that an output of a source driver is marked out-of-date, performing at least the following operations: (1) computing a new arrival time at the output of the source driver, (2) propagating the new arrival time to inputs of gates that are driven by the output of the source driver, and (3) removing an out-of-date mark from the output of the source driver;
 in response to determining that an input of a second gate is marked out-of-date or that a slack margin was not computed for an output of the second gate, performing at least the following operations: (1) propagating arrival times from the input to the output of the second gate, and (2) marking the output of the second gate as having an out-of-date slack margin; and
 in response to determining that an output of a third gate is marked as having an out-of-date slack margin, performing at least the following operations: (1) computing new slack margins for the output of the third gate based on the old arrival time, new arrival time, and old slack margin at the output of the third gate, and (2) computing new slack margins for each input of the third gate based on a new margin at the output of the third gate and an arrival time from each input of the third gate to the output of the third gate.

5. The non-transitory computer-readable storage medium of claim 4, wherein processing gates in the circuit design in a reverse-levelized order comprises:
 assigning a level to each gate in the circuit design, wherein the assigned level is greater than the levels assigned to gates in the fan-out cone of the gate; and
 processing gates in increasing order of their assigned levels.

6. The non-transitory computer-readable storage medium of claim 4, wherein a slack margin at a pin in the circuit design represents an extent to which a change in a slack value at the pin affects a slack value at a timing end-point.

7. An electronic design automation (EDA) apparatus, comprising:
 a processor; and
 a non-transitory computer-readable storage medium storing instructions of an EDA tool that, when executed by the processor, cause the EDA apparatus to perform a method for incrementally propagating slack margins in a circuit design while optimizing the circuit design by processing gates in the circuit design in a reverse-levelized order, the method comprising:
  after replacing a first gate with an alternative gate, marking outputs of source drivers that drive inputs of the alternative gate as out-of-date;
  in response to determining that an output of a source driver is marked out-of-date, performing at least the following operations: (1) computing a new arrival time at the output of the source driver, (2) propagating the new arrival time to inputs of gates that are driven by the output of the source driver, and (3) removing an out-of-date mark from the output of the source driver;
  in response to determining that an input of a second gate is marked out-of-date or that a slack margin was not computed for an output of the second gate, performing at least the following operations: (1) propagating arrival times from the input to the output of the second gate, and (2) marking the output of the second gate as having an out-of-date slack margin; and
  in response to determining that an output of a third gate is marked as having an out-of-date slack margin, performing at least the following operations: (1) computing new slack margins for the output of the third gate based on the old arrival time, new arrival time, and old slack margin at the output of the third gate, and (2) computing new slack margins for each input of the third gate based on a new margin at the output of the third gate and an arrival time from each input of the third gate to the output of the third gate.

8. The EDA apparatus of claim 7, wherein processing gates in the circuit design in a reverse-levelized order comprises:
 assigning a level to each gate in the circuit design, wherein the assigned level is greater than the levels assigned to gates in the fan-out cone of the gate; and
 processing gates in increasing order of their assigned levels.

9. The EDA apparatus of claim 7, wherein a slack margin at a pin in the circuit design represents an extent to which a change in a slack value at the pin affects a slack value at a timing end-point.

* * * * *